(No Model.)

O. H. CONGAR.
GRAFTING IMPLEMENT.

No. 340,700. Patented Apr. 27, 1886.

Witnesses
T. N. Fowler
H. B. Applewhaite

Inventor
O. H. Congar.
By his Attorneys
A. H. Evans & Co.

UNITED STATES PATENT OFFICE.

ORVILLE H. CONGAR, OF PASADENA, CALIFORNIA.

GRAFTING IMPLEMENT.

SPECIFICATION forming part of Letters Patent No. 340,700, dated April 27, 1886.

Application filed January 16, 1886. Serial No. 188,812. (No model.)

*To all whom it may concern:*

Be it known that I, ORVILLE H. CONGAR, of Pasadena, county of Los Angeles, and State of California, have invented an Improvement in Grafting Implements; and I hereby declare the following to be a full, clear, and exact description thereof.

My invention relates to the class of grafting tools or implements designed for properly preparing the scion for that intimate bark-union with the stock which is necessary for the complete success of the operation.

My invention consists in parallel adjustable knives adapted to receive the end of the scion between them, and to cut or shave off from each side sufficient material for a tenon, and in knives working transversely to the parallel knives and on each side thereof, whereby the strips cut by said parallel knives are disengaged or detached to form the complete tenon on the scion.

The object of my invention is to provide a suitable tool for preparing the scion to perfectly fit the mortise in the stock, which mortise is prepared by means of an implement forming the subject-matter of another application for a patent.

Figure 1:
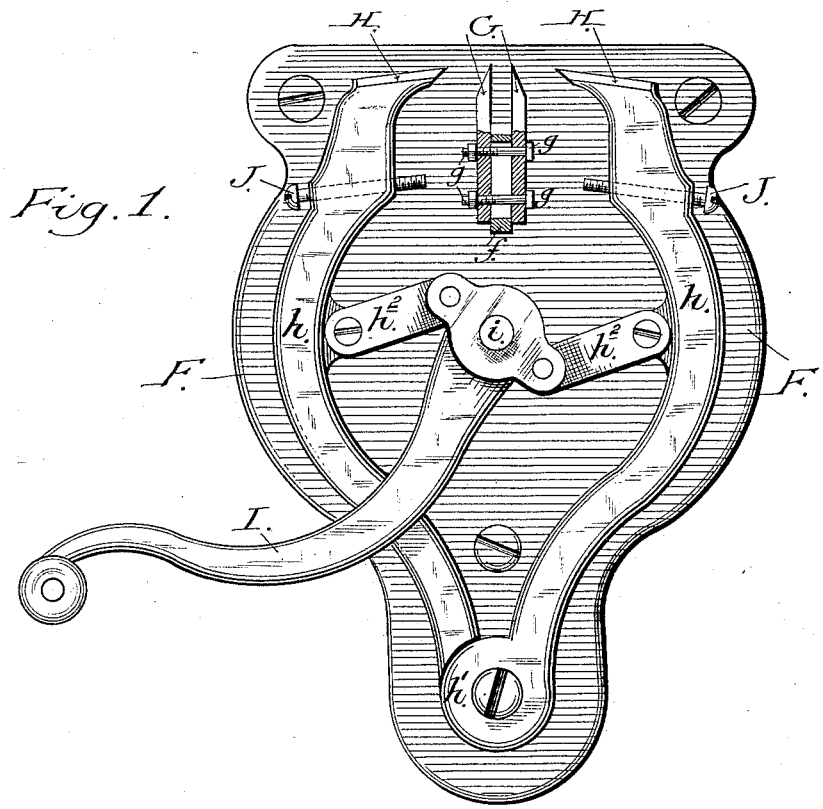
Figure 2:
Figure 3:
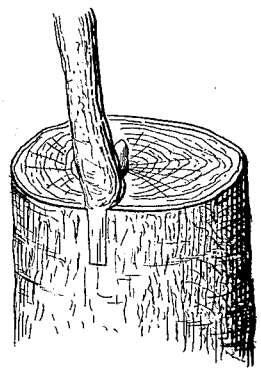

Referring to the accompanying drawings, Figure 1 is a plan of the implement. Fig. 2 shows the scion prepared with its proper tenon. Fig. 3 shows the graft-union between the scion and the stock.

F is a bench or other suitable ground-frame, having secured upon it a strip, $f$, set edgewise to form a seat for the parallel knives G. These knives are also set on edge, their bodies being secured to each side of the strip $f$ and their cutting-edges extending forwardly and beyond said strip. The knives may be adjusted to separate them or to bring them closer together for the purpose of diminishing the space between their cutting-edges, and may also be longitudinally adjusted to increase or diminish their projection beyond the strip $f$, by means of bolts and nuts $g$, which pass through elongated slots in the strip $f$. By these means the thickness and length of the tenon to be formed on the scion may be varied.

H are the transverse or shouldering knives. These lie at the extremities of the knives G, at right angles thereto, and are secured upon the ends of handles $h$, which are pivoted to the bench at the point $h'$, as shown. The handles are connected by links $h^2$, pivoted to said handles and to a lever, I, on either side of its own pivot-center $i$.

By operating the lever I the knives H may be withdrawn from the knives G, or may be forced to approach thereto, their limits of approach being defined by screw-stops J, which bear against the knives G.

The operation of this implement in preparing the scion, as shown in Fig. 2, is as follows: The end of the scion is forced by a blow or other suitable power between the knives G, whereby its sides are cut off to a length governed by the projection of the knives G beyond the end of the strip F. The lever I is then operated to force the transverse knives H inwardly, whereby the strips which were cut off by the knives G are freely detached, leaving square shoulders on the scion and a perfect tenon thereon, as shown in Fig. 2. The tenon thus prepared fits into a correspondingly-shaped mortise in the side of the stock, as is shown in Fig. 3.

I do not wish to confine myself to the precise construction of the implement shown and described, for this may be modified without changing the nature of the invention, which lies more particularly in the knives and their relative positions to each other rather than in the particular means by which power is applied to operate them.

Having thus described my invention, what I claim as new, and desire to secure by Letters Patent, is—

1. In a tool or implement for grafting, parallel spaced knives set edgewise for receiving the end of the scion between them and shaving its sides, in combination with knives working at right angles to the parallel spaced knives and on each side, whereby the shaved sides of the scion are detached, forming a tenon thereon, substantially as described.

2. In a tool or implement for grafting, the longitudinally-adjustable spaced knives G G for receiving the scion between them and cutting its sides to a suitable length by reason of said adjustment, in combination with the transverse knives H H, working at right angles to the knives G G for cutting the shoulders of the tenon, substantially as described.

3. In a tool or implement for grafting, the bench or base F and the seat-strip $f$, secured thereto and having a slot, in combination with the knives G G, secured to each side of said strip $f$, and suitable bolts, whereby the knives may be adjusted laterally and longitudinally, substantially as described.

4. In a tool or implement for grafting, the spaced adjustable knives G G for receiving and shaving the sides of the scion, in combination with the transverse knives H H for detaching the shaved sides of the scion, whereby a tenon having square shoulders is formed, the pivoted handles $h$, on which the knives are secured, and the pivoted lever I and links $h^2$, whereby said knives H H are operated, substantially as described.

5. In a tool or implement for grafting, the combination of the spaced adjustable knives G G, the transverse knives H H, having pivoted handles $h$, operated as described, and the screw-stops J in said handles, acting against the knives G G to define the limits of approach of the knives H H, substantially as described.

In witness whereof I have hereunto set my hand.

ORVILLE H. CONGAR.

Witnesses:
H. H. DOOLITTLE,
A. O. BRISTOL.